United States Patent
Yang

(10) Patent No.: US 11,162,705 B2
(45) Date of Patent: Nov. 2, 2021

(54) REFRIGERATION CYCLE CONTROL

(71) Applicant: Hitachi-Johnson Controls Air Conditioning, Inc, Tokyo (JP)

(72) Inventor: Liming Yang, Mequon, WI (US)

(73) Assignee: Hitachi-Johnson Controls Air Conditioning, Inc, Tokyo (JP)

( * ) Notice: Subject to any disclaimer, the term of this patent is extended or adjusted under 35 U.S.C. 154(b) by 130 days.

(21) Appl. No.: 16/555,056

(22) Filed: Aug. 29, 2019

(65) Prior Publication Data

US 2021/0063043 A1 Mar. 4, 2021

(51) Int. Cl.
| | |
|---|---|
| *F24F 11/84* | (2018.01) |
| *F24F 3/06* | (2006.01) |
| *F25B 41/31* | (2021.01) |
| *G05B 11/42* | (2006.01) |
| *F25B 41/345* | (2021.01) |

(52) U.S. Cl.
CPC ............... *F24F 11/84* (2018.01); *F24F 3/06* (2013.01); *F25B 41/31* (2021.01); *F25B 41/347* (2021.01); *F25B 2600/2513* (2013.01); *G05B 11/42* (2013.01)

(58) Field of Classification Search
CPC ... F24F 11/84; F24F 3/06; F25B 41/03; F25B 41/347; F25B 2600/2513; G05B 11/42
See application file for complete search history.

(56) References Cited

U.S. PATENT DOCUMENTS

| | | | |
|---|---|---|---|
| 4,745,767 A * | 5/1988 | Ohya | F25B 41/31 62/211 |
| 7,762,094 B2 * | 7/2010 | Iwaki | F25B 41/31 62/225 |
| 9,606,516 B2 | 3/2017 | Yamasaki et al. | |
| 2010/0180630 A1* | 7/2010 | Ogawa | F25B 41/20 62/498 |
| 2010/0198416 A1* | 8/2010 | Kasahara | F25B 49/02 700/282 |
| 2015/0027139 A1* | 1/2015 | Lin | F25B 49/02 62/56 |
| 2016/0356518 A1 | 12/2016 | Kurachi et al. | |
| 2017/0010014 A1 | 1/2017 | Miyata et al. | |
| 2017/0010031 A1 | 1/2017 | Naito et al. | |
| 2017/0067697 A1 | 3/2017 | Xue et al. | |
| 2017/0074525 A1 | 3/2017 | Sato et al. | |
| 2017/0204314 A1 | 7/2017 | Tada et al. | |
| 2017/0268790 A1 | 9/2017 | Yokozeki et al. | |

(Continued)

FOREIGN PATENT DOCUMENTS

| | | |
|---|---|---|
| CN | 107923674 A | 9/2015 |
| CN | 105987434 A | 10/2016 |

(Continued)

*Primary Examiner* — Marc E Norman
(74) *Attorney, Agent, or Firm* — Foley & Lardner LLP

(57) ABSTRACT

A refrigerant cycle of the present invention includes including an outdoor unit, a plurality of indoor units, and a controller for controlling the refrigeration cycle using at least one EEV. The controller comprises a velocity PID component executing a velocity PID control using pulse number for driving an EEV, three-state controller determining a driving state of the EEV and generating pulse commands designating the driving state, and a state machine driving the EEV depending on the pulse commands generated by the three-state controller.

17 Claims, 10 Drawing Sheets

(56) References Cited

U.S. PATENT DOCUMENTS

2017/0307246 A1  10/2017  Ohara et al.
2018/0017271 A1* 1/2018  Luo .......................... F24F 11/89

FOREIGN PATENT DOCUMENTS

| | | |
|---|---|---|
| CN | 106123416 A | 11/2016 |
| CN | 106160535 A | 11/2016 |
| CN | 106382768 A | 2/2017 |
| CN | 106461253 A | 2/2017 |
| CN | 106482375 A | 3/2017 |
| CN | 106505881 A | 3/2017 |
| CN | 107305035 A | 10/2017 |
| CN | 107796049 A | 3/2018 |
| CN | 107949749 A | 4/2018 |
| CN | 108027153 A | 5/2018 |
| EP | 2 423 508 B1 | 2/2012 |
| EP | 2 423 612 B1 | 2/2012 |
| EP | 3 112 768 A1 | 1/2017 |
| EP | 3 225 930 A1 | 10/2017 |
| ES | 2638049 T3 | 10/2017 |
| ES | 2638174 T3 | 10/2017 |
| WO | WO-2016/147385 A1 | 9/2016 |
| WO | WO-2016/151655 A1 | 9/2016 |
| WO | WO-2016/151751 A1 | 9/2016 |
| WO | WO-2016/151755 A1 | 9/2016 |
| WO | WO-2016/151756 A1 | 9/2016 |
| WO | WO-2016/158938 A1 | 10/2016 |
| WO | WO-2016/162939 A1 | 10/2016 |
| WO | WO-2016/189717 A1 | 12/2016 |
| WO | WO-2016/194153 A1 | 12/2016 |
| WO | WO-2017/042649 A1 | 3/2017 |
| WO | WO-2017/042942 A1 | 3/2017 |
| WO | WO-2017/187227 A1 | 11/2017 |

\* cited by examiner

| Capacity Demand | Current Capacity | $\Delta C$/Pulse | Set Point (SP) (Pulse) |
|---|---|---|---|
| C1 | C4 | $\Delta C$ | (C1-C4)/$\Delta C$ |
| C2 | C5 | $\Delta C$ | (C2-C5)/$\Delta C$ |
| C3 | C6 | $\Delta C$ | (C3-C6)/$\Delta C$ |
| . . . | . . . | . . . | . . . |

FIG. 4B

REFRIGERATION CYCLE CONTROL

FIELD OF THE DISCLOSURE

The present invention relates to a refrigeration cycle, and particularly relates to a refrigeration cycle and a method for controlling a refrigeration cycle.

BACKGROUND

A VRF (variable refrigerant flow) system has been known as a refrigeration system for buildings. In conventional VRF systems, an EEV (electric expansion valve) is used to control refrigerant thermo-dynamic states circulating in the refrigeration cycle. The EEV is controlled electrically to attain required refrigeration capacity by changing its opening, however, almost all of the conventional VRF system uses poor control on EEV positioning.

In current control strategy for the EEV, a control command in pulses are used to represent positioning, i.e., opening of the EEV. After long-time operation of the EEV, number of pulses and an actual position of the EEV would not match well and the pulses would not control the positioning of the EEV adequately.

In such current system, the EEV will be reset to a zero position, i.e., closed position after lapse of a certain period for the operation. This current strategy would introduce disturbance to the refrigeration system and would provide extra complication to the refrigeration system.

Some technologies are known to control EEV positioning and U.S. Pat. No. 7,762,094 B2 (Patent Literature 1) discloses a PID controller which takes into account an operation velocity of the motor for calculating the number of pulses. The calculated pulses are supplied to the stepping motor for controlling an opening degree of the expansion valve.

U.S. Pat. No. 9,606,516 B2 (Patent Literature 2) discloses a velocity-type PID calculation unit which outputs a velocity type operation command signal accounting amounts corresponding to the deviation. The command signal controls opening/closing of valves.

Although the above prior arts disclose and are known based on velocity-based control of the EEV, it is not sufficient to control the EEV positioning after log-term operation of the refrigeration cycle.

SUMMARY

According to one embodiment, a refrigeration cycle including an outdoor unit, a plurality of indoor units, and a controller for controlling the refrigeration cycle using at least one EEV is provided and the controller comprises: a velocity PID component executing a velocity PID control using pulse number for driving an EEV; a three-state controller determining a driving state of the EEV and generating pulse commands designating the driving state; a state machine driving the EEV depending on the pulse commands generated by the three-state controller.

According to one embodiment, the three-state controller includes storage storing a value for determining the driving state and the pulse number magnified with respect to a stroke time of the EEV.

According to one embodiment, the driving states are opening, closing and stopping states for the EEV.

According to one embodiment, the three-state controller generates the pulse commands for opening the EEV and the pulse commands for closing the EEV depending on the value stored in the storage.

According to one embodiment, the refrigeration cycle accepts a request for manual operation under the velocity PID control and allows the manual operation using computation results of the velocity PID component.

According to one embodiment, the air-conditioning system is a VRF system or a PAC system.

According to one embodiment, a method for controlling a refrigeration cycle including an outdoor unit, a plurality of indoor units is provided. The method comprises: executing a velocity PID control by a velocity PID component using pulse number for driving an EEV; determining a driving state of the EEV and generating pulse commands designating the driving state by a three-state controller; driving the EEV depending on the pulse commands generated by the three-state controller by a state machine.

BRIEF DESCRIPTION OF THE DRAWINGS

FIG. 4B shows a data structure for a PID control scheme of one embodiment according to the present invention.

DETAILED DESCRIPTION

Specific embodiments of the present invention will now be described with referring to accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to limit the invention.

Figure 1:
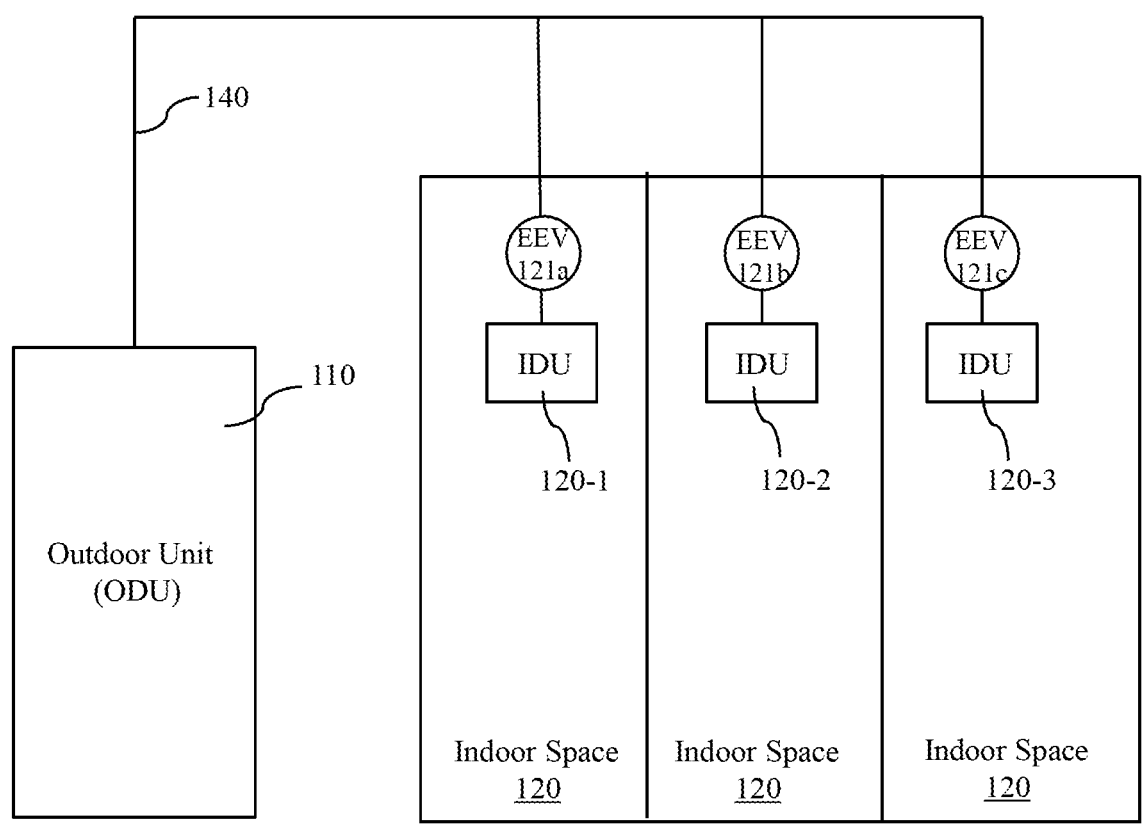
FIG. 1 shows a refrigeration cycle as one embodiment comprising a refrigerant according to the present invention.

FIG. 1 shows a refrigeration cycle as one exemplary embodiment comprising a refrigerant. The exemplary air-conditioning system may be embodied as an air-conditioning apparatus and more preferably may be embodied as a VRF system, a PAC (packaged air-conditioning) system and the like. In this description, as for convenience in description, it is assumed that the refrigerant cycle is implemented in an air-conditioning system constructed as a VRF (variable refrigerant flow) system including an outdoor unit (ODU) 110 and a plurality of indoor units (IDUs) 120-1, 120-2, and 120-3.

Although three IDUs are illustrated as example, more IDUs may be used in the air-conditioning system and a plurality of IDUs may also be placed in an individual indoor space 120 depending on a capacity in a particular indoor space 120. In the embodiment shown in FIG. 1, a plurality of the IDUs 120-1, 120-2, and 120-3 are each placed in the indoor spaces 120 and each of the IDUs 120-1, 120-2, and 120-3 provides air-conditioning of the indoor spaces 120 in which the IDU is placed.

The IDUs 120-1, 120-2, and 120-3 are connected to the ODU 110 through a line 140. The line 140 supplies refrigerant to the IDUs 120-1, 120-2, and 120-3 so as to serve required air-conditioning. A communication line (now shown) is disposed along with the line 140 and connects the ODU 110 with the respective IDUs 120-1, 120-2, and 120-3 for controlling the IDUs 120-1, 120-2, and 120-3 with a controller in the ODU 110.

Each of the IDUs 120-1, 120-2, and 120-3 includes an electric expansion valve (EEV) 121a-121c to serve required heat-exchanging capacity in the indoor spaces 120. The EEVs 121a-121c may be controlled independently by the controller equipped in the ODU 110.

Figure 2:
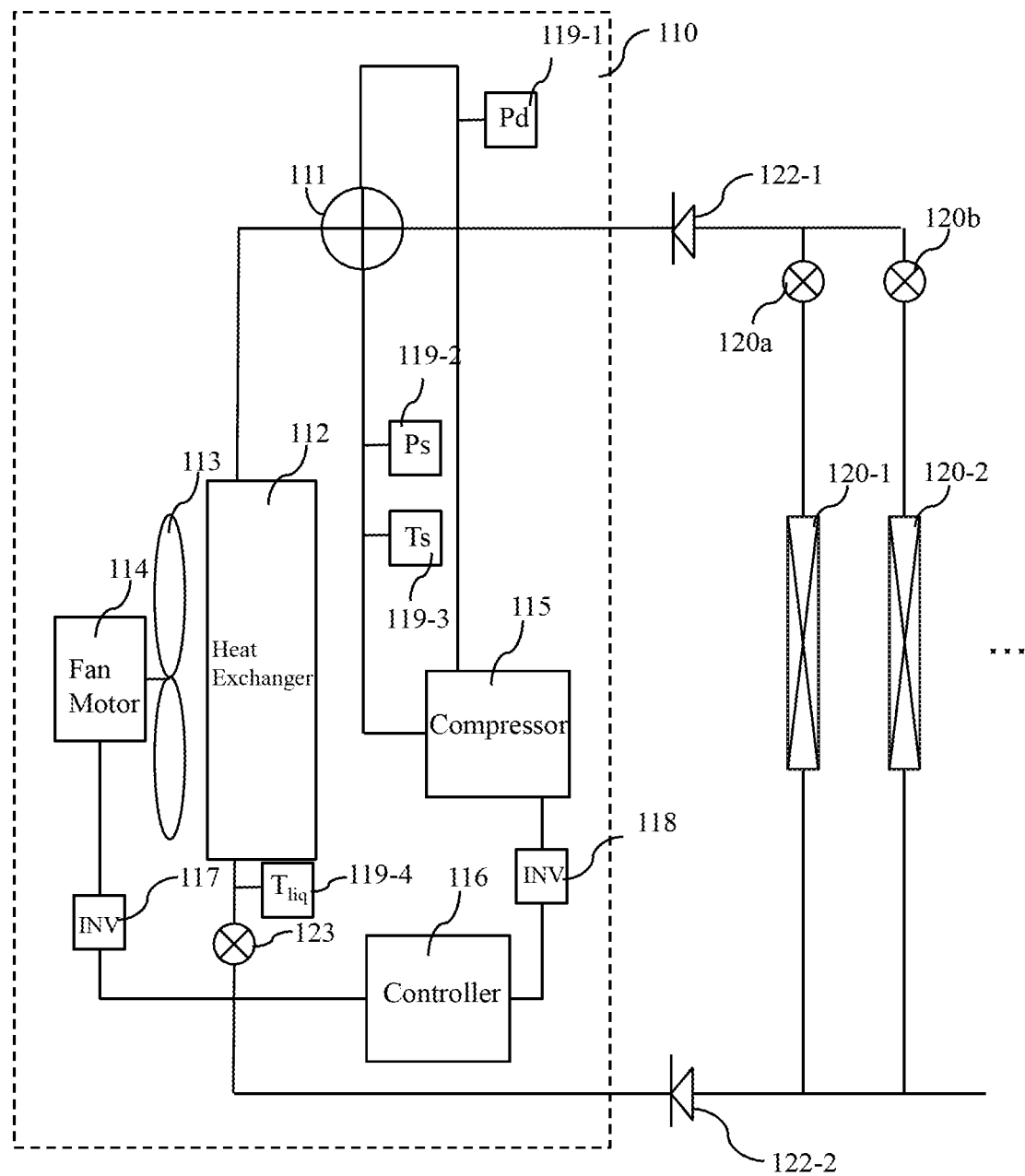
FIG. 2 shows a hardware arrangement of an air conditioning system of one exemplary embodiment according to the present invention.

FIG. 2 shows a hardware arrangement of an air-conditioning system of one exemplary embodiment. The outdoor unit 110 comprises a compressor 115, a heat exchanger 112, and an outdoor fan 113 driven by a fan motor 114. The compressor 115 may be composed by a scroll type compressor and compresses the refrigerant for air-conditioning. The heat exchanger unit 112 performs heat exchange of the refrigerant flowing through a four-way valve 111 to and from the IDUs 120-1, 120-2, 120-3 and so on. In another embodiment, the ODU 110 may be a chiller system including multiple compressors to address air-conditioning for the building.

The outdoor fan 113 blows outdoor air against the heat exchanger 112 for controlling temperature of the heat exchanger 112 as well as temperature of the refrigerant. The outdoor unit 110 further comprises a controller 116 for controlling operation of the air-conditioning system including the compressor 115, the fan 112 through inverters 117, 118, the IDUs 120-1-102-3 and the like so as to achieve adequate air-conditioning.

The outdoor unit 110 further comprises various sensors such as Pd 119-1, Ps 119-2, Ts 119-3, and $T_{liq}$ 119-4. These sensors are used to predict required capacity for air conditioning from parameters of the refrigerant circulating in the air-conditioning system and the sensor Pd 119-1 detects discharge pressure of the refrigerant; the sensor Ps 119-2 detects suction pressure; the sensor Ts 119-3 detects suction temperature and the sensor $T_{liq}$ 119-4 detects temperature of the refrigerant at the position adjacent to the heat exchanger 112.

The outdoor unit 110 is connected with the IDUs 120-1 and 120-2 in the embodiment in FIG. 2 through the pipings, adequate valves 122-1, 122-2 such as a flow regulating valve, and the EEVs 121a-120b such that the refrigerant conditioned in the outdoor unit 110 can be circulated to each of the IDUs 120-1 and 120-2 to achieve demanded air-conditioning. In one embodiment, the controller 116 controls operations of the EEVs 120a-120c and other elements as well as the compressor 115 and the outdoor fan 113 and the like.

The ODU 110 also comprises another EEV 123 and the EEV 123 controls an enthalpy of the refrigerant returned from the IDUs 120-1-120-2 and the like. In one embodiment, the controller can control the EEVs 121a-121c positioned in the IDUs 120-1 and 120-2, or can control the EEV 123 positioned in the ODU 110, or furthermore, can control the EEVs 120a-123c in the IDU 110 as well as the EEV 123 in the ODU 110 depending on particular applications.

Figure 3:
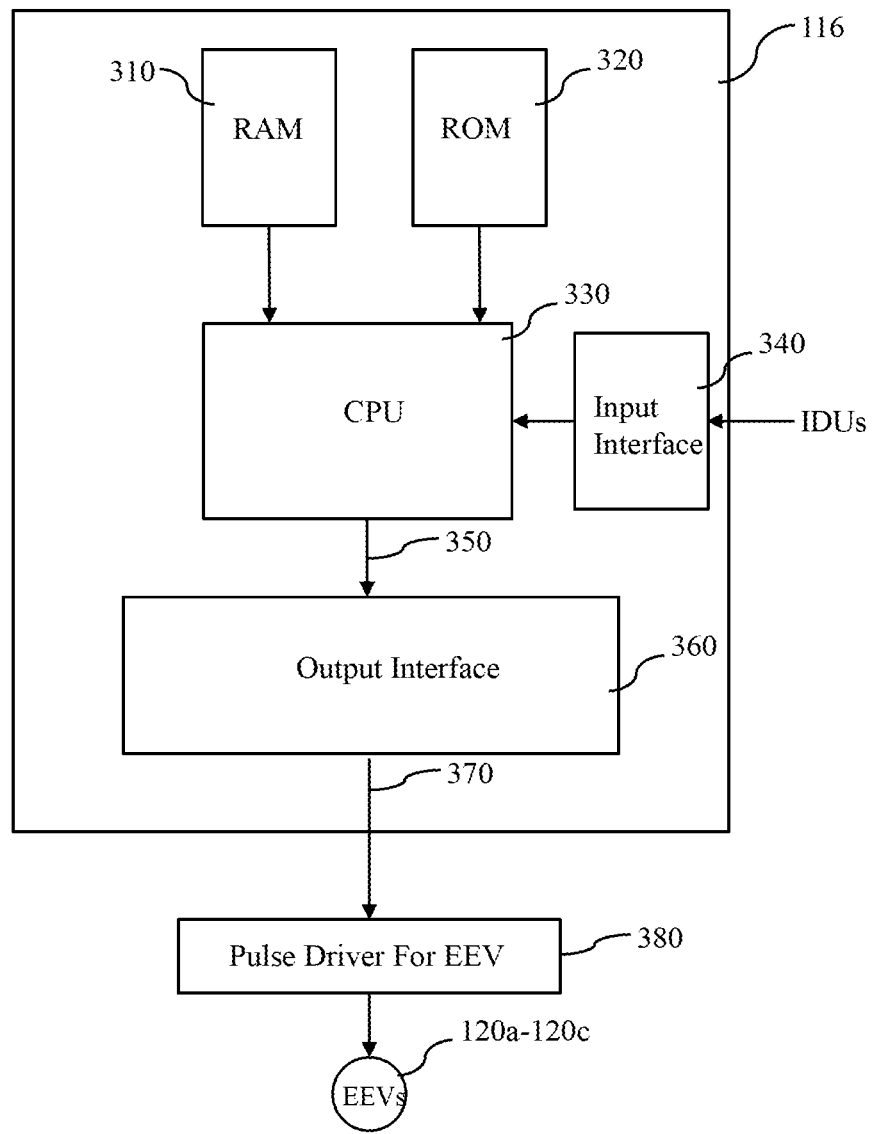
FIG. 3 shows a hardware architecture of the controller 116 of one embodiment according to the present invention.

FIG. 3 shows a hardware architecture of the controller 116. In one embodiment, the controller 116 is implemented as a controller board on which various electronics are implemented and the controller board may be disposed as an electric module in the outdoor unit 110. Although the controller 116 includes other functional modules cooperating the fan motor 114 and the compressor 115 as well as the IDUs 120-1-120-3 and the like, however in FIG. 3, major components relating to the control for the EEVs 120a-120c are illustrated. For an illustrative purpose, a pulse driver 380 for controlling the EEVs 121a-121c is illustrated separately from the controller 116, however, the pulse driver 380 may be included in one component of the controller 116.

The controller 116 comprises a RAM 310, a ROM 320, and a CPU 330. The RAM 310 is a temporal memory for storing various data and provides a working space of the CPU 330. The RAM 310 may be implemented as a separated memory device as depicted in FIG. 3, however, register memories integrated with the CPU 330 may be used in place of and/or together with the RAM 310.

The ROM 320 is a non-volatile memory and stores various kinds of firm-ware and data for performing air-conditioning processing. As the RAM 310, the ROM 320 may be disposed separately from the CPU 330, however, the ROM 320 may be implemented an inside module of the CPU 330. The CPU 330 may be implemented as a microcomputer, an ASIC (application specified integrated circuit), or an SoC chip. Into the CPU 330, data from the IDUs 120-1-120-3 are input through the communication line through an input interface 340 for executing control of the air-conditioning system according to one embodiment.

The data sent from the IDUs 120-1-120-3 may be various data such as input temperature and output temperature of each IDU as well as indoor temperature, but not limited thereto, any data required for executing processings may be sent from the IDUs 120-1-120-3. The CPU 330 applies various processings to the input data and outputs results of the processings to various modules including the EEVs 120-1-120-3 to control the air-conditioning system.

Figure 4A:
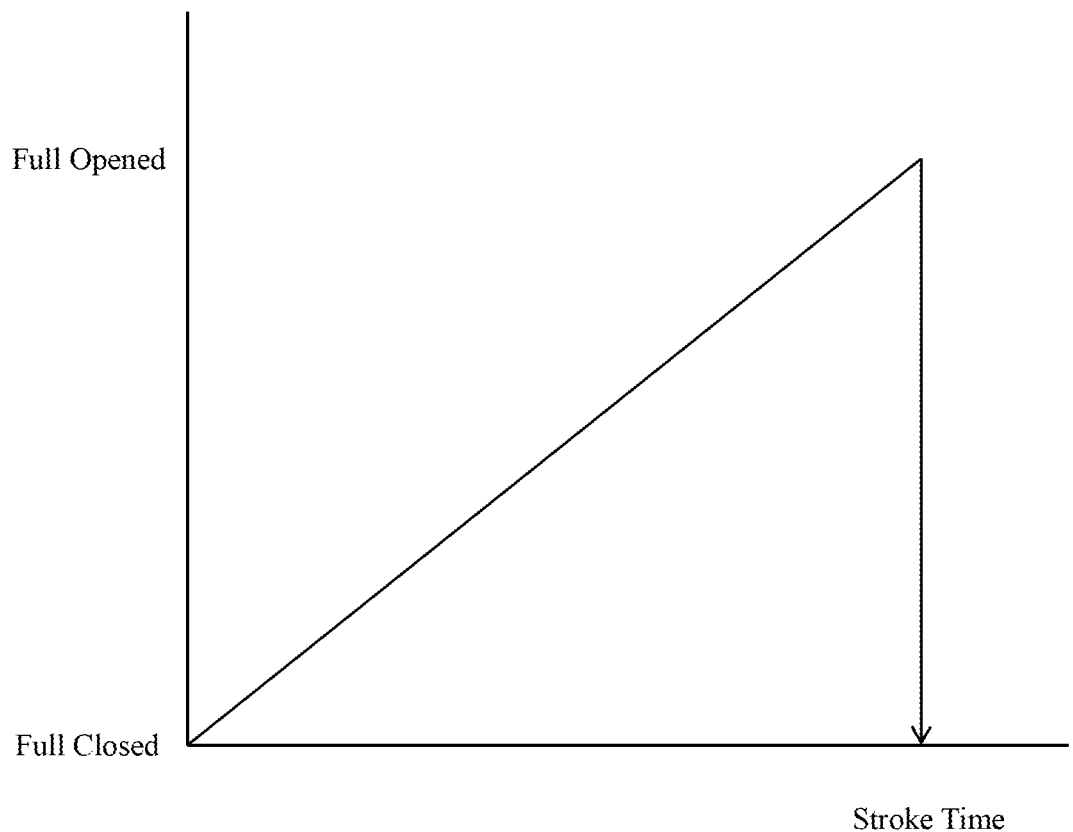
FIG. 4A shows one example of a stroke-time in one embodiment according to the present invention.

In one embodiment, the controller 116 controls opening of the EEVs 120a-120c using a velocity PID algorithm based on stroke-time of the EEVs 120a-120c. The stroke-time is the time that the EEV transits from a full-opened position to a full-closed position. FIG. 4A shows one example of the stroke-time in one embodiment. The stroke-time may be obtained for the particular EEV beforehand and may be stored in adequate storage such as ROM 320 as control data in the firm-ware.

FIG. 4B shows a structure of the data for a velocity PID control scheme of one exemplary embodiment represented as a table format. In FIG. 4B, a column "Capacity Demand" is required capacity to serve adequate air-conditioning at particular time; a column "Current Capacity" is capacity currently served by the IDU; a column "AC/Pulse" is a capacity-change by changing opening of the EEV per pulse. A column "Set Point (SP) (Pulse)" is required pulse number to attain the capacity demand. These data may be obtained beforehand and stored in adequate storage. Such storage may be localized one on the controller and may be storage connected remotely through networks.

Now, it is assumed that the air-conditioning system currently runs at the current capacity of C4 and a capacity demand at that time is assumed to be C1. The controller 116 determines that the current capacity C4 should be changed to C1. Then, the controller 116 calculate the set point (SP) used for the PID control as following Eq. 1.

$$SP = \frac{(C_1 - C_4)}{\Delta C} \quad (1)$$

Here, a sign of SP corresponds to opening or closing of the EEV and the velocity PID control of the embodiment satisfies the capacity demand by controlling opening and/or closing of the EEV 120a-120c by driving pulse motors or stepping motors. The data structure of FIG. 4B is exemplary described in the table format, however, the data structure of FIG. 4B may be functional relations rather than the table format. Furthermore, the data structure of FIG. 4B may be accumulated and leaned by so-called an AI device to develop the PID control progressively. Anyhow, the data structure is not limited to the embodiment shown in FIG. 4B and any data structure allowing the PID control according to the embodiment may be implemented.

In one embodiment, the velocity PID algorithm is performed using the stroke-time of each EEVs 120a-120c without using position sensors for determining the positions of the EEVs. Incorporating the stroke-time of the EEV as the PID control together with a velocity PID control algorithm according to embodiment, requirements of the position sensors may be omitted and the system disturbance to the air-conditioning system due to resetting the opening of EEV to zero can be avoided, thereby costs and operation efficiencies of the air-conditioning system may be improved.

Figure 5:
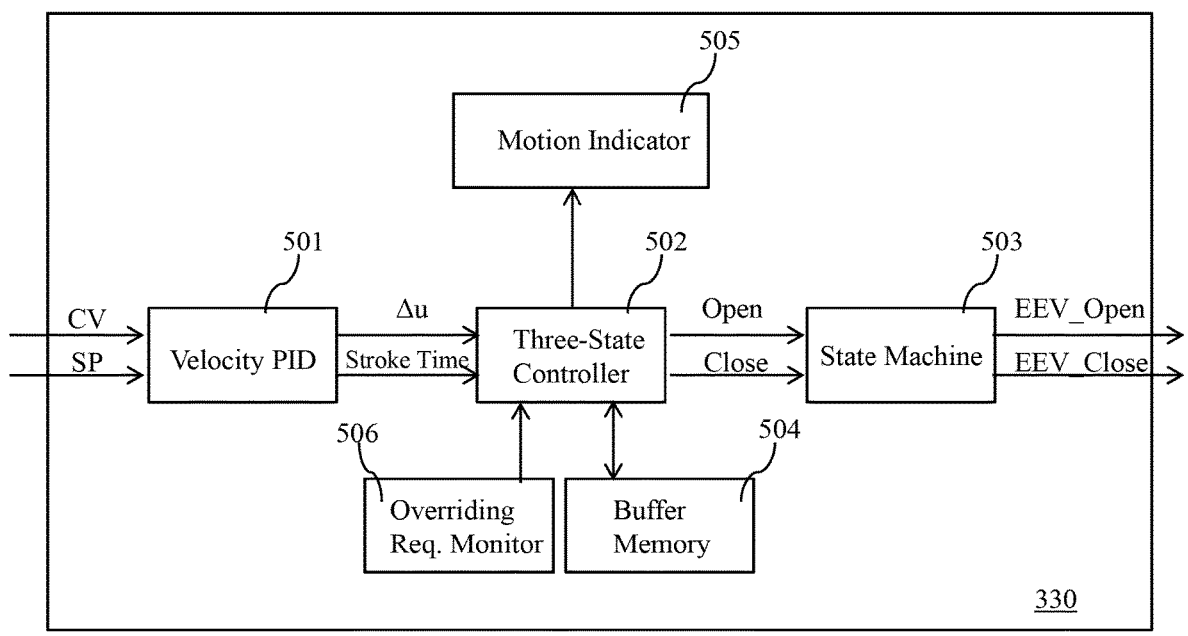
FIG. 5 shows a functional construction implemented in the CPU 330 of one embodiment according to the present invention.

FIG. 5 shows a functional construction implemented in the CPU 330. The functional modules shown in FIG. 5 can be realized by computer executable programs and the CPU 330 reads the programs and executes them in the CPU 330 to perform the processings for the control of one embodiment.

Functional parts shown in FIG. 5 includes a velocity PID component 501, a three-state controller 502, a state machine 503, a buffer memory 504, that is storage utilized for storing data for the velocity PID control of one embodiment, and a motion indicator 505. Each of the functional modules in FIG. 5 may be implemented for each of the EEVs 120a-120c to control the EEV individually.

The velocity PID component 501 is implemented using a conventional PID algorithm to control opening of the EEVs 120a-120c with being input a CV (control value) and a SP (setting point) and for outputting Δu and the Stroke-time. Although the velocity PID component 501 uses the conventional algorithm, however, according to the embodiment, the control value is the pulse number rather than positions. The three-state controller 502 calculates necessary the number of pulses from values of Δu and stores the number of pulses in the buffer memory 504. The calculation of the number of pulses will be described later.

The motion indicator 505 indicates the state of the three-state controller 502 instantly among an auto-state or a stopped-state provided according to one embodiment. Here, the auto-state refers to an operating state that the EEVs 120a-120c are driven automatically by the velocity PID algorithm. Alternatively, the stopped-state refers to the state that the EEVs 120a-120c are kept stopped. The function of the motion indicator 505 will be detailed in relation to processing of the three-state controller 502 and overriding operation to the EEVs.

With respect to the control of the three-state controller 502 in one embodiment, the three-state controller 502 outputs commands for opening and closing the EEV 120a-120c and to transit the position of the EEV 120a-120c while the value in the buffer memory 504 is larger than zero or until the value in the buffer memory 504 becomes within a predetermined small value Δε, i.e., threshold. On the other hand, the three-state controller 502 also issues no command for driving the EEVs depending on the calculation of the velocity PID component 501 when the number of pulses in the buffer memory 504 is within the predetermined small value Δε. In the stopped-state, the EEVs 120a-120c do keep their positions.

This strategy can provide so-called three-state control of the EEVs 120a-120c with omitting zero-resetting of positions of the EEVs 120a-120c and usage of the position sensors. The state machine 503 issues commands for opening and/or closing of the EEVs depending on the particular requirements to control the positioning of the EEVs 120a-120c. The state machine 503 receives the commands from the three-state controller 502 and generates pulses for driving the EEVs 102a-120c depending on EEV Open commands or EEV Close commands.

In another embodiment, the three-state controller 502 may be overridden by manual operation and other overriding operation and the EEVs 120a-120c may be controlled along to schemes provided by the manual operation and other overriding operation, thereby providing flexible control of the EEVs 120a-120c. For addressing to requests such manual operation or other overriding operation, the CPU 330 includes an overriding request monitor 506 that receives requests for an overriding operation.

Now, the velocity PID control of one embodiment will be described in detail using equations. In one embodiment, the velocity PID algorithm is implemented in the velocity PID component 401 with the following Eq. 2:

$$\Delta u = K_{p_i} E \times \Delta t + K_d \frac{\Delta E}{\Delta t} \quad (2)$$

Eq. 2 is a Laplace transformation of input and output functions represented in the velocity PID algorithm. In Eq. 2, Δu is a manipulate amount in pulse number for the EEV; Δt is a time duration used for the velocity PID algorithm; $K_p$ is a transfer function depending on an error, a time-integration of the error and a differential term of the error. $K_p$, $K_i$, and $K_d$ may be determined beforehand and can be stored in the ROM 320 as control data of the system. It is noted that the embodiment uses the pulse number rather than the position of the EEVs such that the position sensors for the EEV may be omitted from each of the IDUs 120-1-120-3.

In the velocity PID algorithm, although the value of u(k) is calculated by using the past u(k−1) to feedback the control, the velocity PID component 401 issues the value of Δu to control opening and/or closing of the EEVs. The value of Δu is converted into the commands or opening and/or closing of the EEVs.

Figure 6:
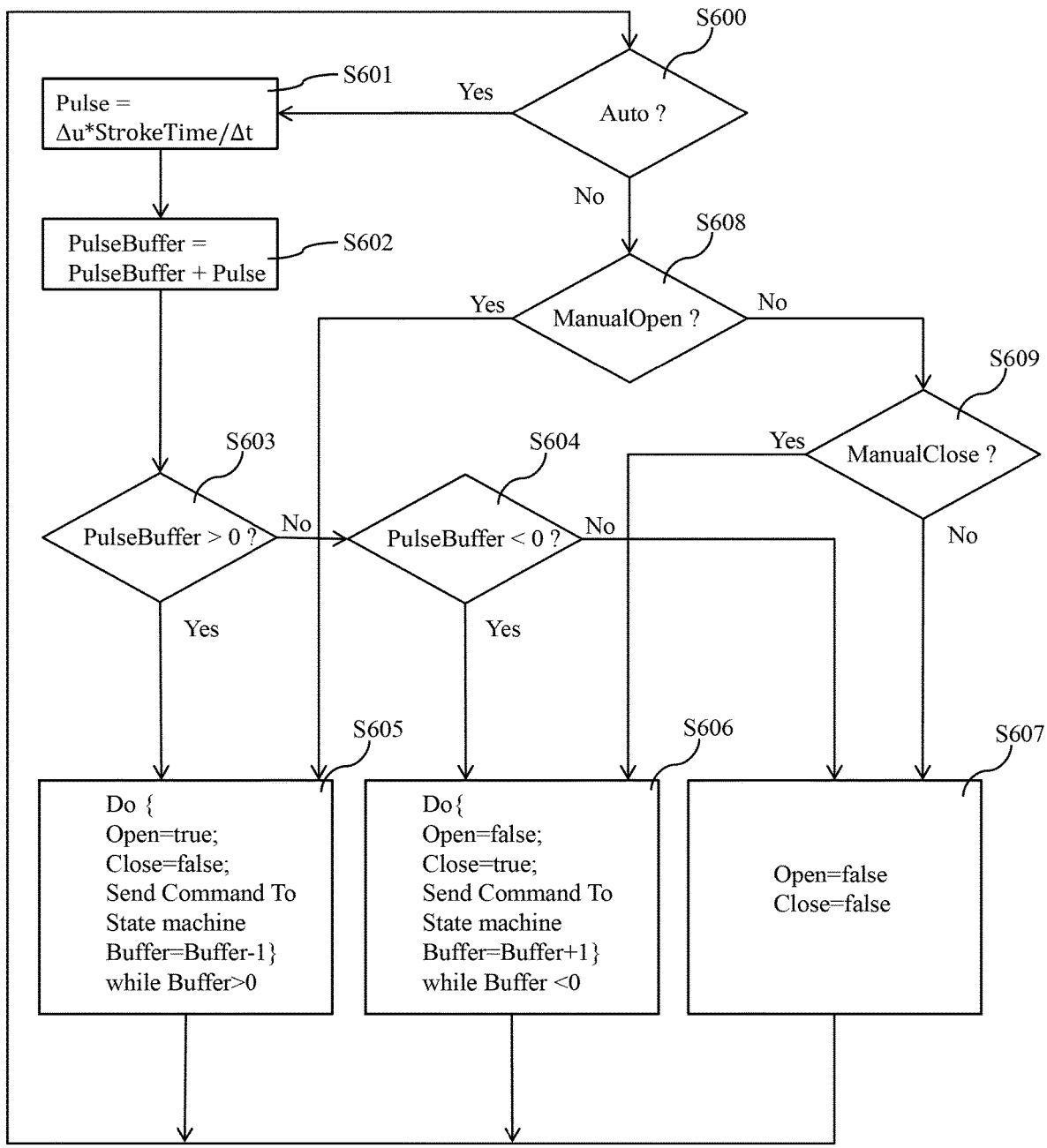
FIG. 6 shows a flowchart of processing that is executed in a three-state controller 502 of one embodiment according to the present invention.

FIG. 6 shows a flowchart of processing that is executed in the three-state controller 502 according to one embodiment. The processing in FIG. 6 starts from Step S600 and first determines whether or not the motion indicator 505 indicates the auto-state. If the state is the auto-state (Yes), the processing diverts to Step S601 and the pulse number for moving the EEV is calculated by the following Eq. 3. In the description hereunder, it is assumed that a positive value indicates opening and a negative value indicates closing of the EEVs.

$$\text{Pulse} = \Delta u \times \frac{StrokeTime}{\Delta t} \quad (3)$$

wherein StrokeTime refers to the stroke-time and Δt refers to a time chunk for the velocity PID calculation. The pulse number accumulated in the buffer memory 504 is thus magnified in relation to the stroke-time and hence, sufficient computation cycles for executing the velocity PID algorism can be ensured.

In Step S602, the calculated pulse number is accumulated in the buffer memory 504 for updating a value of "Pulse-Buffer". The value of the "PulseBuffer" corresponds to a magnified pulse number for generating the commands for driving the stepping motors or the pulsed motors. This calculation may be executed every time chunk of Δt and the processing in FIG. 6 may be repeated until the velocity PID control is terminated. In the described embodiment, adequate integer processing may be applied to the value of the PulseBuffer so as to minimize errors due to rounding processing and also to assure a stable stopped-state.

Then, in Step S603, the three-state controller 502 determines whether or not the value of the PulseBuffer is not less than zero. If the value of PulseBuffer is larger than zero (Yes), the processing diverts to Step S605 and sets a motion flag for opening (Open=true, Close=false) and then sends the commands to the state machine 503 while the value of PulseBuffer is larger than zero.

It may be possible to set a proper threshold on the value of the PulseBuffer such as Δε rather than the numeral zero to avoid fluctuation of the motion of EEVs while assuring a stable duration for the stopped-state. An absolute value of the threshold 1461 may be smaller than one so as to omit fluctuations due to the values after the decimal point while suppressing positional errors caused by introduction of such threshold. It is noted that the value of the PulseBuffer is extended by multiplication of the ratio StrokeTime/Δt according to the present invention, such introduction of the small threshold would degrade practically a positional accuracy.

In this embodiment, an absolute value of the PulseBuffer may be compared with Δε in Step S603 and Step S604 rather than the value of the PulseBuffer. When such threshold is used, the rounding processing is not necessarily implemented. However, both implementations may be selected depending on particular requirements on the implementation and also depending on particular applications. Furthermore, further another embodiment, the value of the PulseBuffer smaller than |Δε| can be zero-cleared before starting the next sampling period (t+1) of the velocity PID calculation to omit accumulation of errors.

The determination of Step S603 returns a negative result (No), the processing diverts to Step S604 and determines whether or not the value of the PulseBuffer is less than zero (negative value). If the value of PulseBuffer is less than zero (Yes), the processing diverts to Step S606 and sets the motion flag for closing (Open=false, Close=true) and then sends the commands to the state machine 503 while the value of PulseBuffer is larger than zero.

If the determination in Step S604 returns a negative result (No), the processing diverts to Step S607 and sets the motion flag (Open=false, Close=false) and no command for driving the EEVs is sent to the state machine 503 in Step S607.

The values of the motion flags may be converted readily to a MotionIndicator value and the state of the three-state machine 502 may be converted by the motion flags as the following Eq. 4.

$$\text{MotionIndicator} = \text{value of Open} \backslash \text{value of Close} \quad (4)$$

In Eq. 4, the value of Open is interpreted into binary one (true) and the value of Close is interpreted into binary zero (false). In this embodiment, when the MotionIndicator value is one, the EEV is now under the opening or closing, and alternatively, when the value of MotionIndicator is zero, the EEV is currently stopped. The motion flags may be used to assign a state of the state machine 503 to control the input/output conditions of the state machine 503. Detail of the state machine will be described later.

Again referring to FIG. 6, when the determination in Step S600 returns a negative result (No), the processing diverts to Step S608 and determines whether or not an overriding request such as the request for ManualOpen is present by checking the overriding request monitor 506. If the overriding request monitor 506 indicates that the overriding request is now asserted such as for ManualOpen, the processing divers to Step S605 and continues the processing in Step S605 while using benefit of the velocity PID control. There is no substantial limitation for formats and types for the overriding requests and any strategy for asserting may also be used in the embodiment.

If the determination in Step S608 returns the negative result (No), the processing diverts to Step S609 to determine whether or not the overring request such as the request for ManualClose is present using the way same with the procedure of Step S608. If the request for ManualClose is present, the processing diverts to Step S606 and continues the processing in Step S606 while using benefit of the velocity PID control.

The processings from Step S608 to Step S609 allows the overriding operation such as manual operation, which is sometimes required as a maintenance or an installation setting under the PID control. Motion states of EEVs 120a-120c is monitored by the value of the motion indicator 505 such that the PID computations executed before can be effectively used in the overring operation and smooth switching between operation modes can be attained. Anytime when the manual operation is required, the processing may readily start the overriding operation such as the manual operation while continuing the velocity PID control. This flexible architecture can allow operation of the air-conditioning system without the position sensor.

Figure 7:
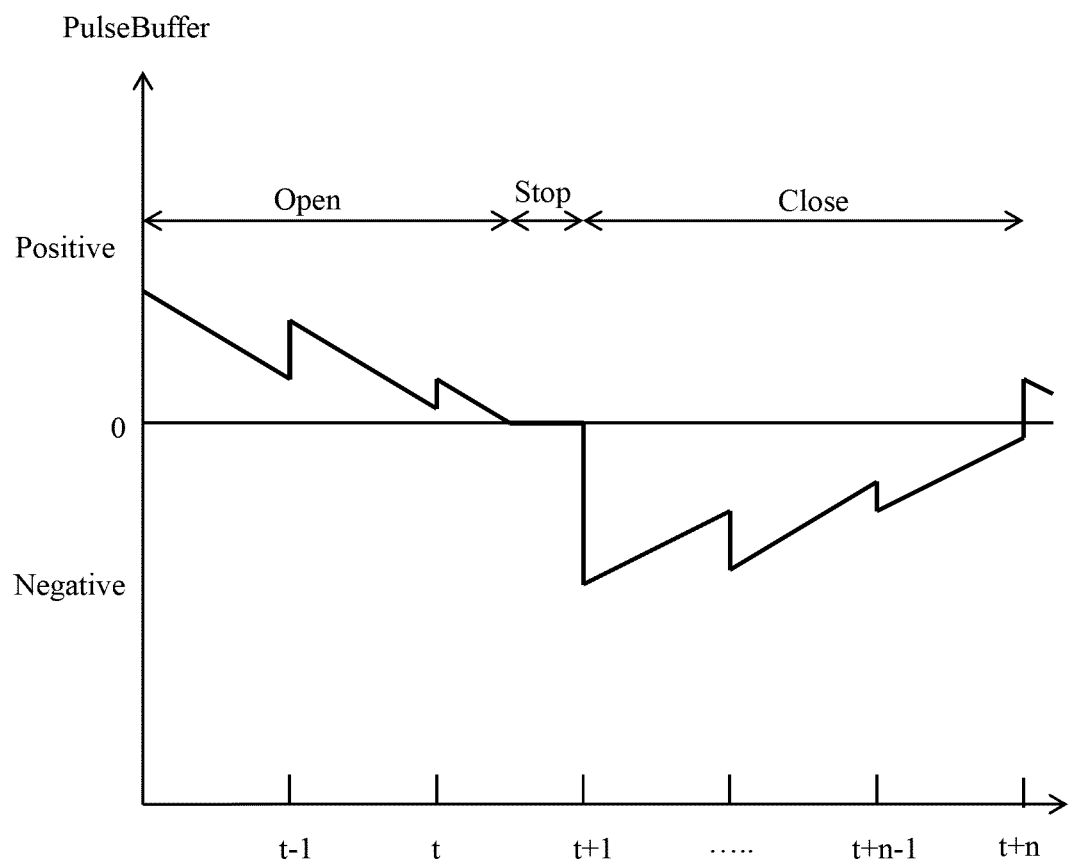
FIG. 7 shows a time variation of transition of a particular EEV controlled by the embodiment according to the present invention.

FIG. 7 shows a time variation of operation states of a particular EEV controlled according to the embodiment. The value of the buffer memory 504 is updated every new time chunk Δt and depending on the Δu value calculated by the velocity PID algorithm, the EEV is opened while the value of the PulseBuffer is larger than zero. When the value of the PulseBuffer becomes zero or within the predetermined threshold, motion control of the EEV is stopped. When the value of PulseBuffer is yet non-zero value or out of the predetermined threshold value due to accumulation of the Δu value, the motion control of the EEV is continued.

If the Δu value is negative at the time chunk (t+1), the value of PulseBuffer becomes negative by the accumulation in the buffer memory 504 so that controller 116 controls the EEV to close and the close motion is kept while the value of PulseBuffer is less than zero or until the value of PulseBuffer becomes within the small threshold at the time chunk (t+n). As illustrated in FIG. 7, the EEV control of the present embodiment attains the three-state control without using the position sensor while omitting zero-reset of the EEV position.

Figure 8:
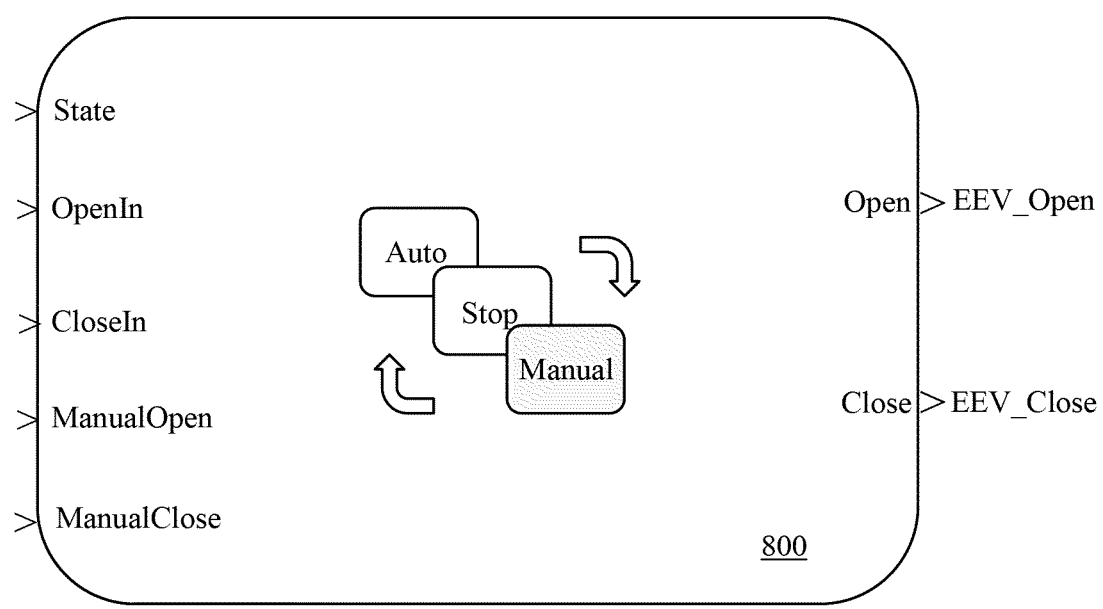
FIG. 8 shows an I/O structure 800 of a state machine 503 of one embodiment according to the present invention.

FIG. 8 shows an I/O structure 800 of a state machine 503. The state machine transits among at least three states such as a stopped-state, an auto-state and a manual state. When another state that overrides the control of the three-state controller 502 is necessary, such state may be incorporated in the state machine 503. In the embodiment shown in FIG. 8, it is assumed that three states such as auto, stopped and manual states are implemented.

Here, the auto-state means the state where the EEV is driven by the three-state controller 502 under the velocity PID control; the stopped-state means the state where the EEV is kept unmoved and the manual state is an overriding state over the auto and the stopped-states. The manual state may be realized by such as an external instruction such as pressing a hardware button or a command for requesting the manual operation to the CPU 330.

An input port "State" indicates the state of the state machine among auto, stopped and manual states that are provided the determination results of the three-state controller 502 and possible another request for overriding operation. Into the "State" port, the motion flags may be input as two-digit binary values indicating the opening, closing and stopped conditions. Input ports "OpenIn" and "CloseIn" are those receiving the commands from the three-state controller 502 issued in Step S605 or Step S606. Input ports "ManualOpen" and "ManualClose" are those receiving the commands from the CPU 330 for the manual operation.

The input ports illustrated in FIG. 8 correspond to kinds of the input to the state machine 503 and in another embodiment, four input ports may be integrated into one port and the state machine 503 switches depending on conditions of the state machine 503 the input commands between output ports "Open" and "Close" for outputting the EEV Open command or the EEV Close command.

The commands input to the state machine 503 may be generated by the three-state controller 502 both for the auto-state and the manual state according to the embodiment. Alternatively, the commands in the manual state may be generated specifically for the manual operation by the CPU 330 rather than the commands generated by the three-state controller 502.

Figure 9:
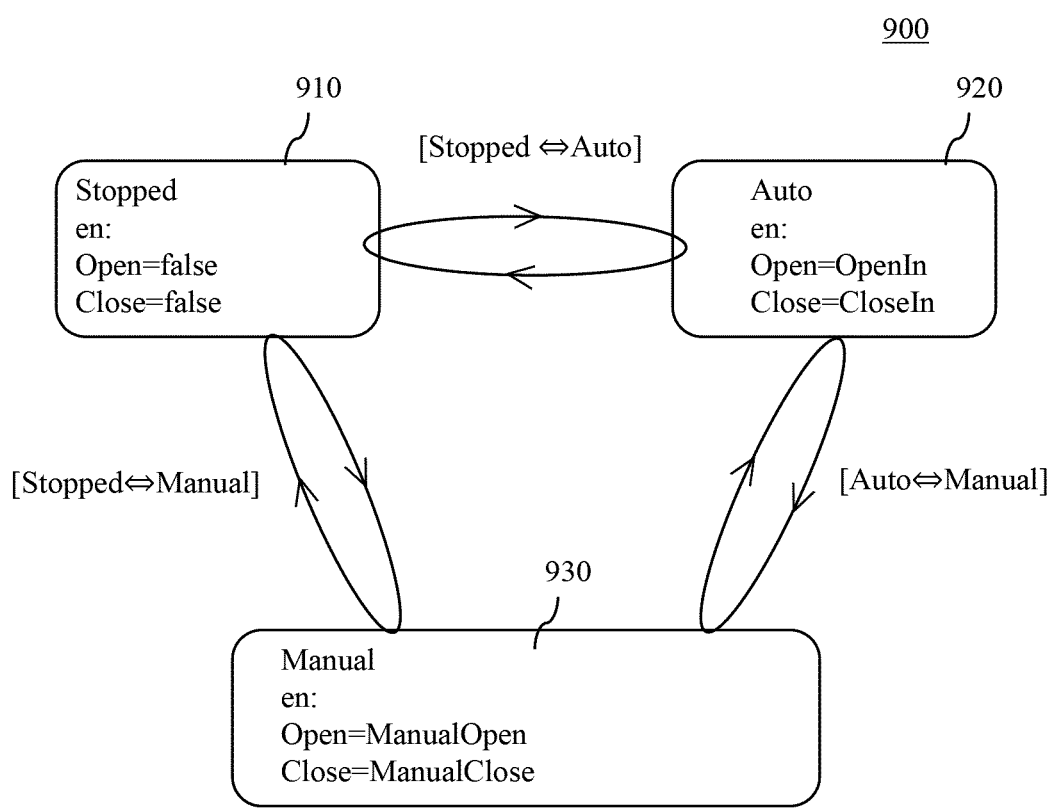
FIG. 9 shows a diagram 900 of a state transition implemented in a state machine 503 of one embodiment according to the present invention.

FIG. 9 shows a diagram 900 of the state transition implemented in the state machine 503. The state machine 503 transits among the stopped-state 910, the auto-state 920, and the manual state 930. In the Stopped-state 910, the output ports Open and Close are both disabled, i.e., both are false. When the state transits to the auto-state, the output ports Open and Close are set to Open=OpenIn or to be Close=CloseIn.

In the manual state 930 the output ports Open and Close are set to Open=ManualOpen and Close=ManualClose. The commands of ManualOpen and ManualClose are those generated by the three-state controller 502 using the velocity PID algorithm according to one embodiment. Alternatively, the commands of ManualOpen or ManualClose are specifically generated by an adequate component depending on particular applications.

In one embodiment, the state machine 503 may include a frequency demultiplexer for reducing the pulse frequency received from the three-state controller 502. Because the value of the PulseBuffer is multiplied by the ratio of Stroke-Time to the time chunk Δt and pulse frequency to the pulse driver 380 for EEV 120a-120c may be adequately reduced so as not to go out of step with respect to the stepping motor or the pulsed motor. In this purpose, the state machine 503 outputs the driving pulses for the EEVs 120a-120c with the reduced frequency.

Further in another embodiment, such frequency demultiplexer may be implemented as one module of the three-state controller 502 and the commands generated by the three-state controller 502 may already be the frequency adjusted ones. In further alternative embodiment, such frequency demultiplexer may be implemented as a module of the controller 116 implemented as one function of the output interface 360.

Particular embodiments have been described so far about the PID control of the EEVs 120a-120c equipped in the IDUs 120-1-120-3 in the VRF system. However, the present PID control may be applied to control the EEV 123 of the ODU 110.

Further another embodiment, an individual controller equipped in each of IDUs 120-1-120-3 may control the local EEV with receiving instructions from the controller 116 rather than the controller 116 remotely controls each of the EEVs 120a-120c in the IDUs 120-1-120-3.

As further another embodiment, the controller 116 may be implemented in a remote server and the remote server controls a local refrigeration cycle as a client system through a network such as a LAN and/or INTERNET. Further another embodiment, the controller 116 may be implemented as a cloud system which provides the air-conditioning services to the local air-conditioning systems through the network.

As described so far, the present embodiment may provide a novel three state control for the refrigeration cycle that makes it possible to avoid extra disturbance to the air-conditioning system due to the zero-reset of EEVs 120a-120c and the like after long-term service while omitting position sensors for detecting the opening positions of EEVs 120a-120c.

Although preferred embodiments of the present invention have been described, the present invention should not be limited to particular relating embodiments, and various modifications and alternations may be made by those having ordinary skill in the art without departing scope of the present invention and the true scope should be determined only by appended claims.

What is claimed is:

1. A refrigeration cycle including an outdoor unit, a plurality of indoor units, and a controller for controlling the refrigeration cycle using at least one electronic expansion valve (EEV), the controller comprising:
    a velocity PID component executing velocity PID control using a pulse number for driving an EEV;
    a three-state controller determining a driving state of the EEV and generating pulse commands designating the driving state; and
    a state machine driving the EEV depending on the pulse commands generated by the three-state controller;
    wherein the three-state controller includes storage storing a value for determining the driving state of the refrigeration cycle among opening, closing, and stopping and the value is magnified with respect to a stroke time of the EEV relative to a time duration used for a velocity PID algorithm.

2. The refrigeration cycle of claim 1, wherein the driving state is selected from a plurality of potential driving states of the EEV, the driving states comprising an opening state, a closing state, and a stopping state.

3. The refrigeration cycle of claim 1, wherein the three-state controller generates the pulse commands for opening the EEV and the pulse commands for closing the EEV depending on the value stored in the storage.

4. The refrigeration cycle of claim 1, wherein the refrigeration cycle accepts a request for manual operation under the velocity PID control and allows the manual operation using computation results of the velocity PID component.

5. The refrigeration cycle of claim 4, wherein the refrigeration cycle forms at least part of an air-conditioning system and the air-conditioning system is a VRF (Variable Refrigerant Flow) system or a PAC (Packaged Air-Conditioning) system.

6. A method for controlling a refrigeration cycle including an outdoor unit and a plurality of indoor units, the method comprising:
executing velocity PID control, by a velocity PID component, using a pulse number for driving an electronic expansion valve (EEV);
determining, by a three-state controller, a driving state of the EEV and generating, by the three-state controller, pulse commands designating the driving state; and
driving, by a state machine, the EEV depending on the pulse commands generated by the three-state controller;
wherein the three-state controller includes storage storing a value for determining the driving state of the refrigeration cycle among opening, closing, and stopping, and the value is magnified with respect to a stroke time of the EEV relative to a time duration used for a velocity PID algorithm.

7. The method of claim 6, wherein the driving state is selected from a plurality of potential driving states of the EEV, the driving states comprising an opening state, a closing state, and a stopping state.

8. The method of claim 6, wherein the three-state controller generates the pulse commands for opening the EEV and the pulse commands for closing the EEV depending on the value stored in the storage.

9. The method of claim 6, further comprising accepting a request for manual operation under the velocity PID control and allowing the manual operation using computation results of the velocity PID component.

10. The method of claim 6, wherein the refrigeration cycle forms at least part of an air-conditioning system and the air-conditioning system is a VRF (Variable Refrigerant Flow) system or a PAC (Packaged Air-Conditioning) system.

11. A controller for a refrigeration cycle including an outdoor unit, a plurality of indoor units, and the controller for controlling the refrigeration cycle using at least one electronic expansion valve (EEV), the controller comprising:
a velocity PID component executing velocity PID control using a pulse number for driving an EEV;
a three-state controller determining a driving state of the EEV and generating pulse commands designating the driving state;
a state machine driving the EEV depending on the pulse commands generated by the three-state controller,
wherein the three-state controller includes storage storing a value for determining the driving state of the refrigeration cycle among opening, closing, and stopping, and the value is magnified with respect to a stroke time of the EEV relative to a time duration used for a velocity PID algorithm.

12. The controller of claim 11, wherein the refrigeration cycle accepts a request for manual operation under the velocity PID control and allows the manual operation using computation results of the velocity PID component.

13. The controller of claim 11, wherein the driving state is selected from a plurality of potential driving states of the EEV, the driving states comprising an opening state, a closing state, and a stopping state.

14. The controller of claim 11, wherein the refrigeration cycle forms at least part of an air-conditioning system and the air-conditioning system is a VRF (Variable Refrigerant Flow) system or a PAC (Packaged Air-Conditioning) system.

15. The controller of claim 11, wherein the controller is positioned remotely from the refrigeration cycle.

16. The controller of claim 15, wherein the controller is configured to communicate with the refrigeration cycle through a network.

17. The controller of claim 11, wherein the controller is positioned within the outdoor unit or within at least one of the plurality of indoor units.

* * * * *